United States Patent
Drayton et al.

(10) Patent No.: US 11,003,631 B2
(45) Date of Patent: May 11, 2021

(54) APPARATUS AND METHOD FOR IMPLEMENTING PROCESS CONTROL REDUNDANCY USING OPERATING SYSTEM (OS) FILE SYSTEM SUPPORT

(71) Applicant: Honeywell International Inc., Morris Plains, NJ (US)

(72) Inventors: Gary Drayton, King of Prussia, PA (US); Norman Swanson, Douglassville, PA (US); Christopher Pulini, Ambler, PA (US)

(73) Assignee: Honeywell International Inc, Morris Plains, NJ (US)

( * ) Notice: Subject to any disclaimer, the term of this patent is extended or adjusted under 35 U.S.C. 154(b) by 47 days.

(21) Appl. No.: 16/678,439

(22) Filed: Nov. 8, 2019

(65) Prior Publication Data
US 2020/0151146 A1   May 14, 2020

Related U.S. Application Data (60) Provisional application No. 62/758,837, filed on Nov. 12, 2018.

(51) Int. Cl.
| | |
|---|---|
| *G06F 16/00* | (2019.01) |
| *G06F 16/178* | (2019.01) |
| *G06F 16/23* | (2019.01) |
| *G06F 12/0804* | (2016.01) |

(52) U.S. Cl.
CPC ........ *G06F 16/178* (2019.01); *G06F 12/0804* (2013.01); *G06F 16/2365* (2019.01)

(58) Field of Classification Search
CPC ............... G06F 16/178; G06F 16/2365; G06F 11/2097; G06F 11/2082; G06F 11/2064; G06F 11/2048; G06F 12/0804
See application file for complete search history.

(56) References Cited

U.S. PATENT DOCUMENTS

| | | | |
|---|---|---|---|
| 7,103,722 B2* | 9/2006 | Benveniste | G06F 12/0864 711/118 |
| 8,176,252 B1* | 5/2012 | Alexander | G06F 13/28 711/118 |
| 8,495,301 B1* | 7/2013 | Alexander | G06F 13/28 711/118 |

* cited by examiner

*Primary Examiner* — Cheryl Lewis
(74) *Attorney, Agent, or Firm* — Paschall & Associates, LLC; James C. Paschall (57) ABSTRACT

A method for use by a first device associated with a redundant second device includes issuing a synchronization request to a file system of the first device. The file system is configured to cache changes associated with a memory space of an application, the synchronization request causing the file system to send the cached changes to a driver of the first device The driver is used to commit the cached changes to a copy of the memory space of the application in order to cause the copy of the memory space of the application to match the memory space of the application. One or more changes made to the copy of the memory space of the application caused by committing the cached changes are identified. A change set identifying the one or more changes being made to the copy of the memory space of the application is created in a buffer and the change set transmitted from the buffer to the second device in order to synchronize an additional copy of the memory space of the application at the second device.

20 Claims, 4 Drawing Sheets

APPARATUS AND METHOD FOR IMPLEMENTING PROCESS CONTROL REDUNDANCY USING OPERATING SYSTEM (OS) FILE SYSTEM SUPPORT

CROSS-REFERENCE TO RELATED APPLICATION AND PRIORITY CLAIM

This application claims priority under 35 U.S.C. § 119(e) to U.S. Provisional Patent Application No. 62/758,837 filed on Nov. 12, 2018. This provisional application is hereby incorporated by reference in its entirety.

TECHNICAL FIELD

This disclosure relates generally to industrial process control and automation systems. More specifically, this disclosure relates to an apparatus and method for implementing process control redundancy using operating system (OS) file system support.

BACKGROUND

Industrial process control and automation systems are often used to automate large and complex industrial processes. These types of systems routinely include various components such as sensors, actuators, and process controllers. Some of the process controllers can receive measurements from the sensors and generate control signals for the actuators. The failure of an industrial control and automation system (such as the failure of a process controller) can lead to costly downtimes. For example, there is often expense involved in restarting an industrial process, along with actual production losses resulting from a failure. Thus, control and automation systems often include redundant control system components, such as redundant process controllers. Redundant process controllers typically need to support both hardware and software redundancy in order to ensure that one process controller can take over control operations if the other process controller fails or otherwise goes offline.

SUMMARY

This disclosure provides an apparatus and method for implementing process control redundancy using operating system (OS) file system support.

In a first embodiment, a method is disclosed for use by a first device associated with a redundant second device, the method includes issuing a synchronization request to a file system of the first device. The file system is configured to cache changes associated with a memory space of an application, the synchronization request causing the file system to send the cached changes to a driver of the first device The driver is used to commit the cached changes to a copy of the memory space of the application in order to cause the copy of the memory space of the application to match the memory space of the application and identifying one or more changes made to the copy of the memory space of the application caused by committing the cached changes. A change set identifying the one or more changes being made to the copy of the memory space of the application is created in a buffer and the change set transmitted from the buffer to the second device in order to synchronize an additional copy of the memory space of the application at the second device.

In a second embodiment, an apparatus is disclosed used by a first device associated with a redundant second device, the apparatus includes at least one memory and at least one processor issuing a synchronization request to a file system of the at least one memory of the first device. The file system is configured to cache changes associated with a memory space of an application, the synchronization request causing the file system to send the cached changes to a driver of the first device. The driver commits the cached changes to a copy of the memory space of the application in order to cause the copy of the memory space of the application to match the memory space of the application and identifying one or more changes made to the copy of the memory space of the application caused by committing the cached changes. A buffer receives the change set identifying the one or more changes being made to the copy of the memory space of the application and transmits the change set from the buffer to the second device in order to synchronize an additional copy of the memory space of the application at the second device.

In a third embodiment, a non-transitory computer readable medium is disclosed containing instruction that when executed cause at least one processor of a first device associated with a redundant second device to issue a synchronization request to a file system of the first device, the file system is configured to cache changes associated with a memory space of an application, the synchronization request causing the file system to send the cached changes to a driver of the first device. The driver is used to commit the cached changes to a copy of the memory space of the application in order to cause the copy of the memory space of the application to match the memory space of the application and identifying one or more changes being made to the copy of the memory space of the application caused by committing the cached changes. A change set identifying the one or more changes being made to the copy of the memory space of the application is created in a buffer and the change set transmitted from the buffer to the second device in order to synchronize an additional copy of the memory space of the application at the second device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems often include redundant control system components, such as redundant process controllers. Redundant process controllers typically need to support both hardware and software redundancy in order to ensure that one process controller can take over control operations if the other process controller fails or otherwise goes offline. Process control industry customers have an expectation of high reliability when using fault-tolerant control system components that include hardware and software redundancy. To support high reliability, process data received or generated by a primary process controller also typically needs to be provided to a secondary process controller. This enables the secondary process controller to continue to provide process control in case the primary process controller fails or otherwise goes offline.

Current techniques for identifying data that is received or generated by a control algorithm in one control system component for transmission to a redundant control system component often require the use of custom hardware. For example, custom hardware can be added to a control module in order to snoop data reads or data writes performed by the central processing unit (CPU) in one control system component. The snooped data can then be transmitted to the redundant control system component. Unfortunately, this approach cannot be used to support redundant execution of control algorithms on standard hardware (such as commercial off-the-shelf or "COTS" hardware) that does not include the custom hardware.

This disclosure provides techniques supporting process control redundancy using operating system (OS) file system support. As described in more detail below, these techniques allow data being used by one control system component to be identified and provided to a redundant control system component. This is accomplished using standard file system support that is built into most modern operating systems today. Thus, the operating system present on the control system component can be used to identify the data to be transmitted to the redundant control system component.

In this way, these approaches help to reduce or eliminate the need for custom hardware in control system components (at least as it relates to custom hardware for identifying and transmitting data between the control system components). These approaches also do not rely on the use of a trap algorithm that performs data writes in the user space of a control system component.

Figure 1:
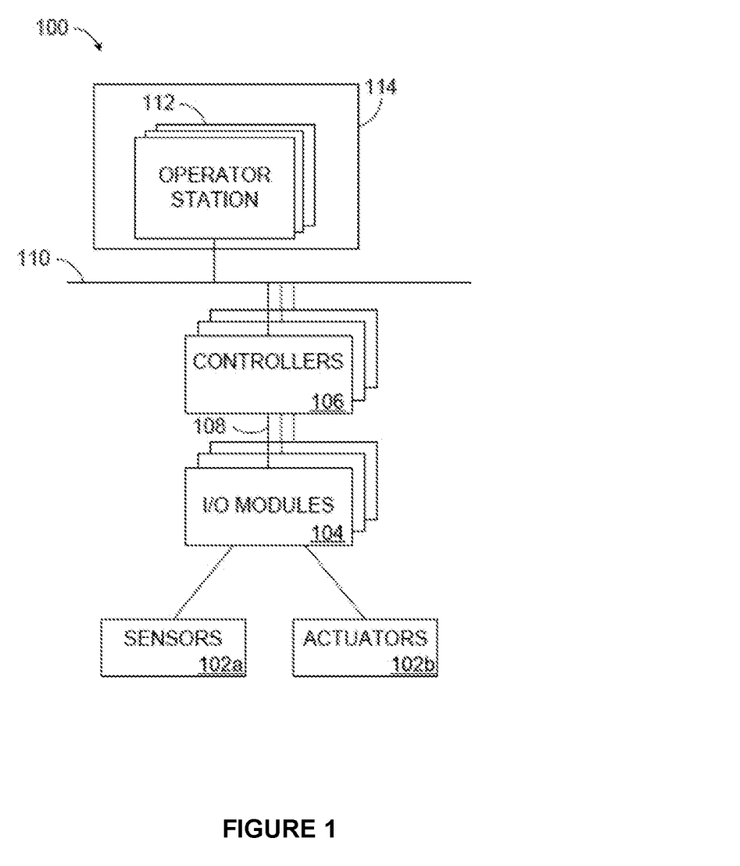
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interactions with the sensors 102a, actuators 102b, or other field devices. For example, an I/O module 104 could be used to receive one or more analog inputs (AIs), digital inputs (DIs), digital input sequences of events (DISOEs), pulse accumulator inputs (PIs), or other inputs from one or more field devices. An I/O module 104 could also be used to provide one or more analog outputs (AOs), digital outputs (DOs), or other outputs to one or more field devices. Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O modules 104. A second set of controllers 106 could be used to optimize the control logic or other operations performed by the first set of controllers. A third set of controllers 106 could be used to perform additional functions.

At least one pair of controllers 106 in the system 100 can function as a redundant pair of process controllers. For these controllers 106, it is common for one controller 106 to be operating in the primary mode, where that controller 106 is receiving process data (such as from one or more sensors 102a), performing calculations, and generating output (such as one or more control signals for one or more actuators 102b). Another controller 106 typically operates in the secondary or backup mode, where that controller 106 receives the data that is received or generated by the primary controller 106 and is ready to take over control if the primary controller 106 fails or otherwise goes offline. Note that one, some, or all of the controllers 106 in the system 100 could have an associated redundant controller.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

At least some of the controllers 106 can interact with the field devices through the I/O modules 104 by communicating over at least one I/O network 108. The I/O network 108 generally represents any suitable network configured to transport data between field devices and controllers or other control system components. For example, the I/O network 108 could represent at least one Ethernet network (such as one supporting a FOUNDATION FIELDBUS protocol), electrical signal network (such as a HIGHWAY ADDRESS- ABLE REMOTE TRANSDUCER or "HART" network), pneumatic control signal network, or any other or additional type(s) of network(s).

At least some of the controllers 106 can also interact with other devices by communicating over at least one control network 110. The control network 110 generally represents any suitable network configured to transport data between controllers and servers, historians, or other higher-level components. For example, the control network 110 could represent an Ethernet network, a redundant pair of Ethernet networks (such as a FAULT TOLERANT ETHERNET network from HONEYWELL INTERNATIONAL INC.), or any other or additional type(s) of network(s).

Operator access to and interaction with the controllers 106 and other components of the system 100 can occur via various operator stations 112. Each operator station 112 could be used to provide information to an operator and receive information from an operator. For example, each operator station 112 could provide information identifying a current state of an industrial process to an operator, such as values of various process variables and warnings, alarms, or other states associated with the industrial process. Each operator station 112 could also receive information affecting how the industrial process is controlled, such as by receiving setpoints for process variables controlled by the controllers 106 or other information that alters or affects how the controllers 106 control the industrial process. Each operator station 112 includes any suitable structure for displaying information to and interacting with an operator.

Multiple operator stations 112 can be grouped together and used in one or more control rooms 114. Each control room 114 could include any number of operator stations 112 in any suitable arrangement. In some embodiments, multiple control rooms 114 can be used to control an industrial plant, such as when each control room 114 contains operator stations 112 used to manage a discrete part of the industrial plant.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In systems such as the system 100, redundant controllers 106 or other redundant control system components need an effective way for data to be provided from a primary control system component to a secondary control system component. As described in more detail below, techniques are provided in this patent document supporting the identification of changed data using operating system (OS) file system support for transfer between redundant control system components. The OS file system support can represent the file system support that is present in most or all operating systems in use today. Additional details regarding this functionality are provided below.

Although FIG. 1 illustrates one example of an industrial process control and automation system 100, various changes may be made to FIG. 1. For example, the system 100 could include any number of sensors, actuators, I/O modules, controllers, networks, operator consoles, control rooms, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where OS file system support can be used to enable effective data transfer between redundant control system components. This functionality can be used in any other suitable system, and that system may or may not relate to industrial process control and automation.

Figure 2:
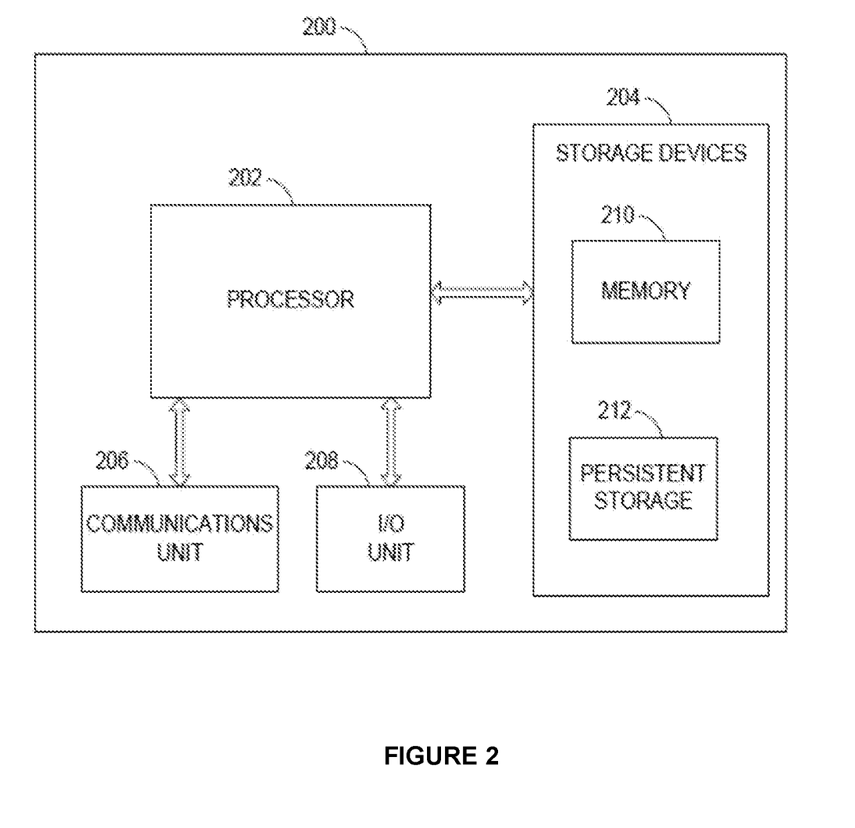
FIG. 2 illustrates an example device for implementing process control redundancy using operating system (OS) file system support according to this disclosure.

FIG. 2 illustrates an example device 200 for implementing process control redundancy using OS file system support according to this disclosure. The device 200 could, for example, represent any of the controllers 106 or other control system components used in a redundant configuration in FIG. 1. However, the device 200 could represent any other suitable device supporting operation in a redundant manner, regardless of whether the device 200 is used for process control and automation.

As shown in FIG. 2, the device 200 includes at least one processor 202, at least one storage device 204, at least one communications unit 206, and at least one I/O unit 208. Each processor 202 can execute instructions, such as those that may be loaded into a memory 210. Each processor 202 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include at least one network interface card or wireless transceiver facilitating communications over at least one wired or wireless network. As a particular example, the communications unit 206 could support communications with one or more sensors 102a or one or more actuators 102b over an I/O network 108. As another particular example, the communications unit 206 could support communications with higher-level components over a control network 110. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the use of the I/O unit 208 for local I/O may not be needed, such as when the device 200 is accessible locally or remotely over a network connection.

As described in more detail below, the processor 202 of the device 200 can be used to execute an operating system that has file system support. The processor 202 of the device 200 can also be used to execute an algorithm that supports the transfer of data from the device 200 to a redundant device (such as a redundant process controller 106).

Although FIG. 2 illustrates one example of a device 200 for implementing process control redundancy using OS file system support, various changes may be made to FIG. 2. For example, various components in FIG. 2 could be combined, further subdivided, or omitted and additional components could be added according to particular needs. Also, computing devices can come in a wide variety of configurations, and FIG. 2 does not limit this disclosure to any particular configuration of device.

Figure 3:
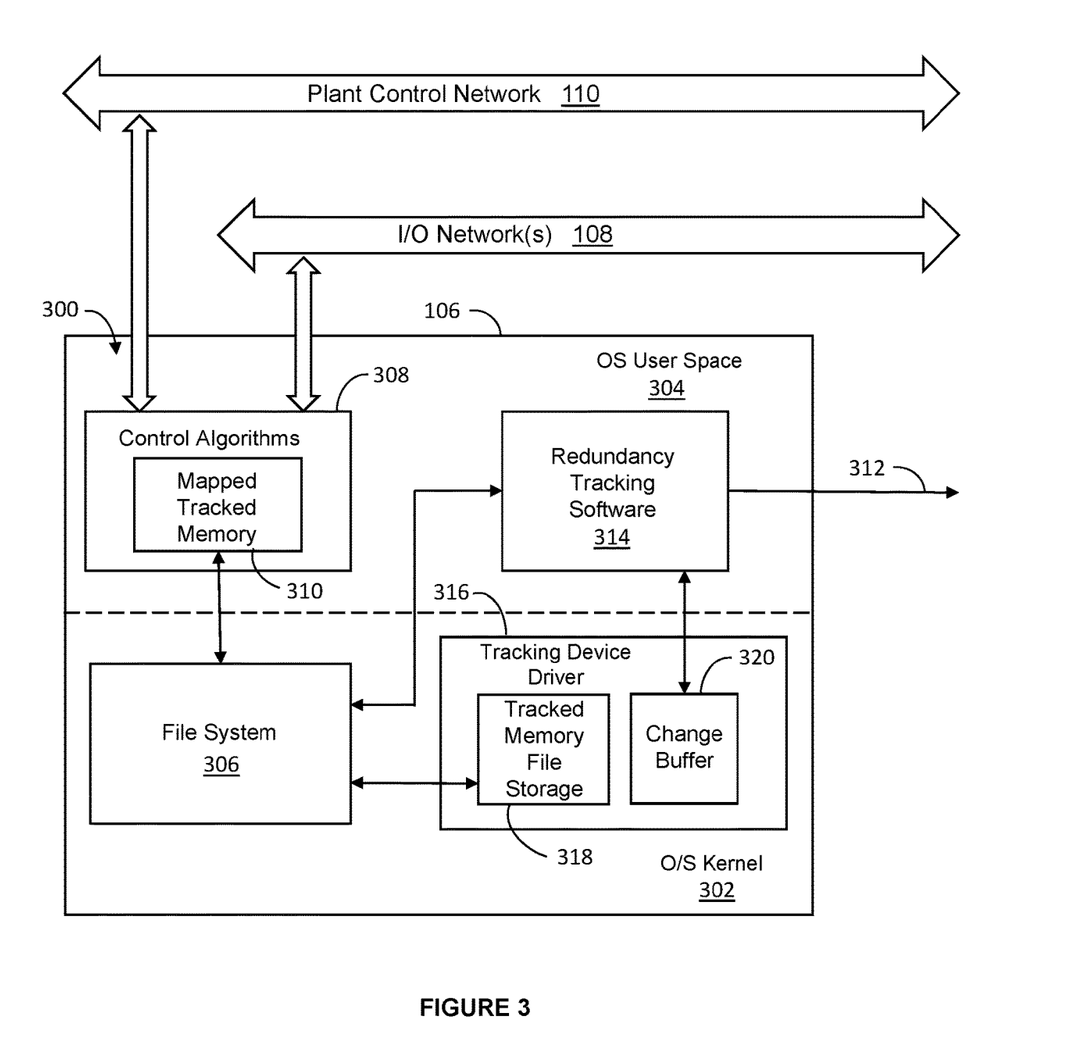
FIG. 3 illustrates an example architecture for implementing process control redundancy using OS file system support according to this disclosure.

FIG. 3 illustrates an example architecture 300 for implementing to process control redundancy using OS file system support according to this disclosure. For ease of explanation, the architecture 300 may be described as being implemented within a controller 106 in the system 100 of FIG. 1, where the controller 106 is implemented using the device 200 of FIG. 2. However, the architecture 300 shown in FIG. 3 can be used with any suitable device and in any suitable system.

In this example, the architecture 300 includes an operating system kernel 302 and an operating system user space 304. The kernel 302 generally represents the core of the device's operating system, while the user space 304 generally represents the code executing outside the kernel 302 and is often used to interact with the kernel 302. As can be seen here, part of the kernel 302 includes a file system 306, which generally operates to control how data is stored and retrieved by the kernel 302 or applications running in the user space 304. In this example, the user space 304 is used to execute one or more control algorithms 308, each of which can be used to control one or more aspects of at least one industrial process. Each control algorithm 308 typically includes or has access to an associated memory 310, which could represent memory locations in the memory 210, persistent storage 212, or other storage device 204. One operation of at least one of the control algorithms 308 is to track and send data to a redundant device, which in this example occurs via a communication path 312. The communication path 312 could represent a direct connection to the redundant device or an indirect path, such as via a network.

To support the transparent identification of changes to a tracked memory area, the architecture 300 includes a tracking device driver 316. The tracking device driver 316 contains a tracked memory file storage 318, which could represent memory locations in the memory 210, persistent storage 212, or other storage device 204. In some embodiments, at least one of the control algorithms 308 can use a user process virtual memory address space, which maps memory provided by the file system 306 from the tracked memory file storage 318 to the algorithm memory (mapped tracked memory) 310 to hold algorithm state data. The control algorithm 308 is executed, and algorithm state data is stored into the mapped tracked memory 310. When the file system 306 synchronizes the changes in the mapped tracked memory 310 to the tracked memory file storage 318, the tracking device driver 316 updates a tracking change buffer 320 and updates the tracked memory file storage 318. To support the transmission of data to the redundant device, the architecture 300 includes redundancy tracking software 314. Periodically or on-demand, the redundancy tracking software 314 requests the file system 306 to perform a sync and sends the tracking change buffer 320 to the redundant partner device. Code can be used to open one or more memory-mapped views of the tracked memory file storage 310.

Upon receipt of the sync command, the file system 306 presents the tracking device driver 316 with a list of pages in the mapped tracked memory 310 that have been written since the last sync command. The tracking device driver 316 compares the list of the block(s) to be written to against its tracked memory file storage 318 and generates a complete set of changes between the two into the tracking change buffer 320. The tracking device driver 316 can update its tracked memory file storage 318 as changes are generated and stored in the tracking change buffer 320. The contents of the tracking change buffer 320 are sent to the secondary device and unpacked into the secondary device's tracked memory file storage 318. The tracking change buffer 320 or portions thereof can be sent to the secondary device periodically, after a specified number of changes have been identified, after a specified amount of time has elapsed, or at any other suitable time(s). In this way, the secondary device is able to obtain data changes being made by the primary device and is able to update its own memory, allowing the secondary device to take over operation if the primary device fails or otherwise goes offline.

The redundancy tracking software 314 is used to facilitate the exchange of data with the secondary device. In some embodiments, the same architecture 300 shown in FIG. 3 can be used in both devices. When referring to a primary device in a redundant set of devices, the redundancy tracking software 314 can generate sync commands to the file system 306 to synchronize all file data to the physical storage device 204. The redundancy tracking software 314 can also make requests to the tracking device driver 316 to obtain the current set of changes in the tracking change buffer 320. The redundancy tracking software 314 can then send the changes from the tracking change buffer 320 to the secondary device via the communication path 312. When referring to a secondary device in a redundant set of devices, the redundancy tracking software 314 can receive the changes to the primary device's tracking change buffer 320 and unpack the changes into its own tracked memory file storage 318.

In this example, the file system 306 can be used to support various functions. These functions include reading data from and writing data to files on one or more physical or virtual storage devices 204. These functions also include mapping the data of the files stored on the storage device(s) 204 into any user process virtual memory address spaces. These functions further include providing the mapped tracked memory 310 for at least one control algorithm 308 mapped into the file system 306. In addition, these functions include receiving sync requests from the redundancy tracking software 314 and committing all changes in the tracked memory 310 to the storage device(s) 204.

In this example, the tracking device driver 316 can also be used to support various functions. These functions include implementing a virtual storage for use by the file system 306. These functions also include maintaining, in the virtual storage, the tracked memory file storage 318 of the last known state of the memory 310. These functions further include providing the file system 306 with a copy of any memory block in the tracked memory file storage 318 being read and accepting requests from the file system 306 to write to/update any memory block in the tracked memory file storage 318 of the memory 310. The tracking device driver 316 also implements and maintains the tracking change buffer 320. The tracking device driver 316 further provides the set of changes in the tracking change buffer 320 to the redundancy tracking software 314, such as upon request. The tracking device driver 316 can be extended for any multiplicity of the tracked memory file storage 318 and its associated change buffer 320, such as to support asynchronous syncing of separate areas of the tracked memory file storage 318.

Although FIG. 3 illustrates one example of an architecture 300 for implementing process control redundancy using OS file system support, various changes may be made to FIG. 3. For example, the functionality in the architecture 300 can vary as needed or desired, such as based on the particular operating system being used in a device. Also, the algorithm(s) 308 in the user space 304 need not relate to industrial process control and automation functions.

Figure 4:
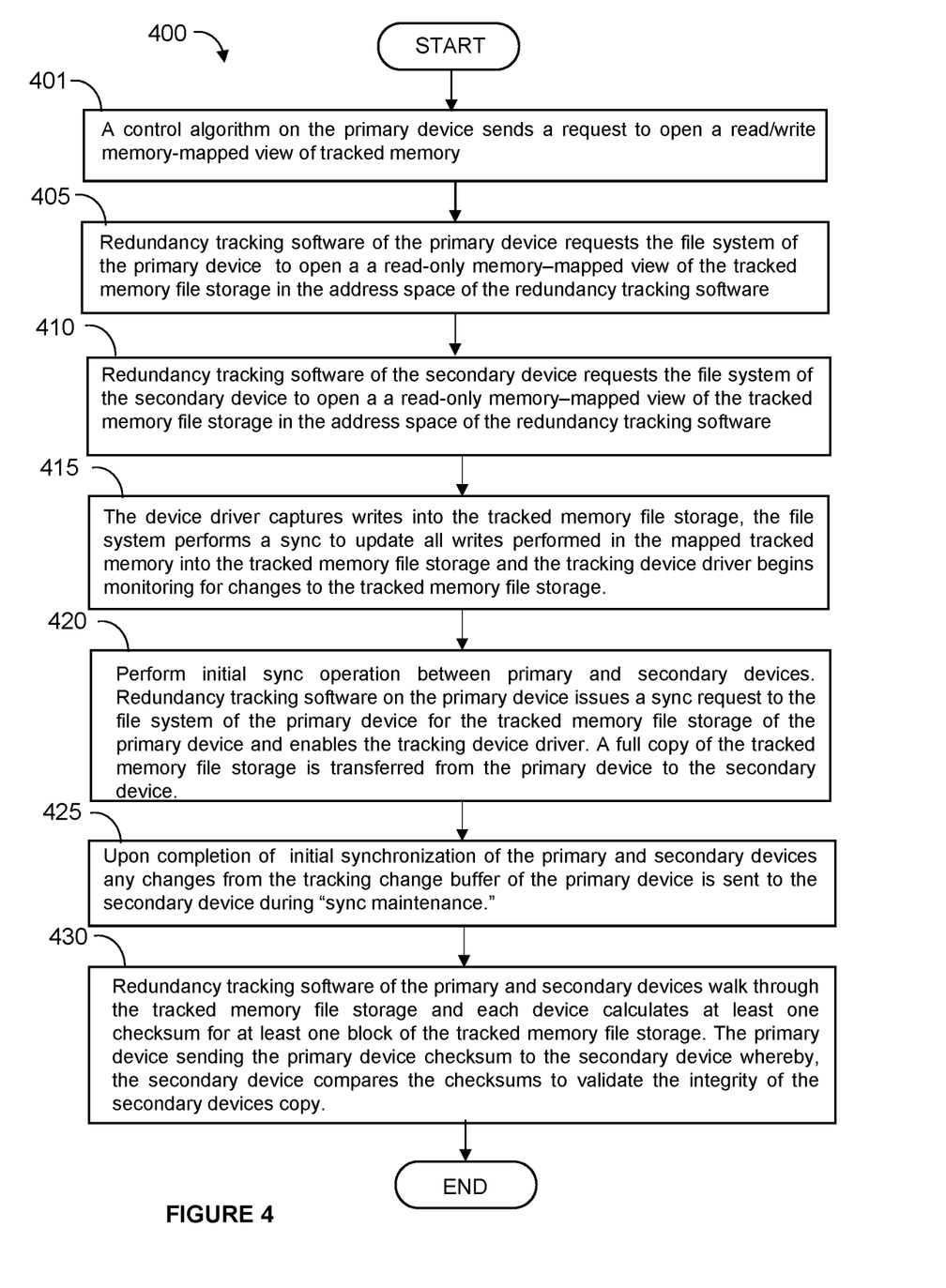
FIG. 4 illustrates an example process for implementing control redundancy using OS file system support according to this disclosure.

FIG. 4 illustrates an example process 400 for implementing control redundancy using OS file system support in accordance with disclosed embodiments and the architecture 300 disclosed in FIG. 3.

At step 401, during initial setup, a control algorithm 308 on a primary device sends a request to the file system 306 of the primary device to open a read/write memory-mapped view of the tracked memory 310 in the address space of the control algorithm 308. The control algorithm 308 will use this view to read and write state data to and from its memory space.

At step 405, the redundancy tracking software 314 of the primary device makes a request to the file system 306 of the primary device to open a read-only memory-mapped view of the tracked memory file storage 318 in the address space of the redundancy tracking software 314. The redundancy tracking software 314 will use this view to transfer an initial copy of the tracked memory file storage 318 to the secondary device. Periodically or at other times, the redundancy tracking software 314 will choose at least one block of memory in the tracked memory file storage 318, generate at least one checksum for the block(s), and send the checksum(s) with at least one block description to the secondary device for validation. The primary device may choose the block(s) in a way that will cover all of the tracked memory 310 over time.

Next at step 410, the redundancy tracking software 314 on the secondary device makes a request to the file system 306 of the secondary device to open a read/write memory-mapped view of the tracked memory file storage 318 in the address space of the redundancy tracking software 314. The redundancy tracking software 314 of the secondary device will use this view to copy changes provided from the primary device into the secondary view in order to maintain an exact copy of the tracked memory file storage 318 from the primary device in the secondary device. Periodically or at other times, the redundancy tracking software 314 will use this secondary view to calculate checksums of the actual memory that can be compared with checksums provided by the primary device in order to test that the memory on the primary and secondary devices have checksums that match. This helps to ensure consistency between the devices.

To enable the tracking device driver 316 to capture writes into the tracked memory file storage 318, the file system 306 is commanded to perform a sync, at step 415, to update all writes performed in the mapped tracked memory 310 into the tracked memory file storage 318, and the tracking device driver 316 is commanded to begin monitoring for changes to the tracked memory file storage 318. The command to the file system 306 here helps to align the tracked memory file storage 318 with all updates so that the tracking device driver 316 can use the tracked memory file storage 318 to detect all future updates once the tracking device driver 316 is enabled. On startup initialization, the tracking device driver 316 ensures the tracking change buffer 320 has no entries. Prior to enabling the tracking device driver 316, file system 306 syncs to the tracked memory file storage 318 do not update the tracking change buffer 320. On disabling the tracking device driver 316, any entries in the tracking change buffer 320 can be discarded. To prevent the tracking change buffer 320 from growing out of bounds, the redundancy tracking software 314 can periodically send contents of the tracking change buffer 320 to the secondary device, or the tracking device driver 316 can be disabled when the redundancy tracking software 314 is not planning to send the contents of the tracking change buffer 320 to the secondary device.

Prior to an initial sync operation, the primary and secondary devices are not a synchronized pair. In order to become a synchronized pair, at step 420, the two devices can perform an initial sync operation. The redundancy tracking software 314 on the primary device issues a sync request to the file system 306 of the primary device for the tracked memory file storage 318 of the primary device and enables the tracking device driver 316. Initial synchronization typically requires that a full copy of the tracked memory file storage 318 be transferred from the primary device to the secondary device. In some embodiments, the primary device could perform the one-time transfer of the entire tracked memory file storage 318 from the primary device to the secondary device while the tracking device driver 316 is enabled. However, in some cases, the size of the tracked memory file storage 318 may prohibit this approach. Thus, in other embodiments, the redundancy tracking software 314 can perform a "trickle" sync of the tracked memory file storage 318, such as by sending slices of the tracked memory file storage 318 and the contents of the tracking change buffer 320 over time.

On the primary device, the redundancy tracking software 314 commences initial sync by issuing a sync request to the file system 306 for the tracked memory file storage 318 and enabling the tracking device driver 316. The control algorithm 308 and the redundancy tracking software 314 continue forward in execution, where both reach periodic or other sync points (such as when the algorithms are not executing and the redundancy tracking software 314 is allowed to collect changes and send these changes to the secondary device). At each sync point, the redundancy tracking software 314 of the primary device issues a sync request to the file system 306 to commit all cached changes to the "physical storage" (as above), sends at least one block of the tracked memory file storage 318 at the current sync offset to the secondary device, increments the sync offset by the size of the block(s), requests from the tracking device driver 316 all changes in the tracking change buffer 320, and sends these changes to the secondary device. At each sync point, the redundancy tracking software 314 of the secondary device receives the initial sync block of the tracked memory file storage 318 and copies it to the appropriate sync offset, updates the sync offset, receives the set of changes from the tracking change buffer 320 of the primary device, and applies these changes to the tracked memory file storage 318 of the secondary device. The above actions can be repeated until the initial sync offset reaches the end of the tracked memory file storage 318, indicating that the devices are now fully synchronized.

At step 425, once the initial sync is complete, the two devices represent a fully synchronized pair, and all that is required is to continue to send changes from the tracking change buffer 320 of the primary device to the secondary device during "sync maintenance."

During this phase, as is shown at step 430, the redundancy tracking software 314 of the primary device walks through the tracked memory file storage 318 (similar to during the initial sync above) and calculates at least one checksum for at least one block of the tracked memory file storage 318. The at least one checksum is sent to the secondary device for validation of the secondary device's copy of the tracked memory file storage 318. At each sync point, the redundancy tracking software 314 on the primary device issues a sync request to the file system 306 of the primary device to commit all cached changes to the "physical storage" (as above), calculates at least one checksum on at least one block of memory at the current sync maintenance offset, increments the offset by the size of the block(s), and sends the at least one checksum to the secondary device for validation. The tracking software 314 on the primary device also requests, from the tracking device driver 316, all changes in the tracking change buffer 320 and sends these changes to the secondary device. At each sync point, the redundancy tracking software 314 on the secondary device receives the set of changes from the tracking change buffer 320 of the primary device and applies these changes to the tracked memory file storage 318 of the secondary device. The redundancy tracking software 314 on the secondary device also receives the sync maintenance checksum on the current maintenance block(s) of memory, calculates a checksum for the corresponding block(s) in the tracked memory 310 of the secondary device, and compares the checksums to validate the integrity of the secondary's copy. Synchronization can be broken if the checksums do not match.

In some embodiments, the control algorithm 308 of the secondary device can be held in a "hot stand-by" mode, where the control algorithm 308 is ready to immediately operate on the algorithm state data that has been maintained in the memory of the secondary device as described above. Thus, if and when the primary device fails or otherwise goes offline, the secondary device is able to immediately take over and perform desired operations, such as control operations in an industrial setting.

Although FIG. 4 illustrates one example of a process for implementing process control redundancy using OS file system support, various changes to the process may be made to FIG. 4. For example, while shown as series of steps, various steps shown in FIG. 4 could overlap, occur in parallel, occur in a different order, or occur multiple times. Moreover, some steps could be combined or removed, and additional steps could be added according to particular needs. In addition, while the process 400 is described with respect to the functionality of an architecture 300, the algorithm(s) 308 in the user space 304 need not relate to industrial process control and automation functions.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for use by a first device associated with a redundant second device, the method comprising:
    issuing a synchronization request to a file system of the first device, the file system configured to cache changes associated with a memory space of an application, the synchronization request causing the file system to send the cached changes to a driver of the first device;
    using the driver, committing the cached changes to a copy of the memory space of the application in order to cause the copy of the memory space of the application to match the memory space of the application;
    identifying one or more changes being made to the copy of the memory space of the application caused by committing the cached changes;
    creating, in a buffer, a change set identifying the one or more changes being made to the copy of the memory space of the application; and
    transmitting the change set from the buffer to the second device in order to synchronize an additional copy of the memory space of the application at the second device.

2. The method of claim 1, wherein:
the application is executed within an operating system user space; and
the driver and the file system are executed within an operating system kernel.

3. The method of claim 1, further comprising:
calculating at least one checksum for at least one block of the buffer; and
sending the at least one checksum to the second device.

4. The method of claim 1, wherein the issuing, committing, identifying, creating, and transmitting are performed repeatedly to maintain synchronization of the additional copy of the memory space of the application at the second device with the memory space of the application at the first device.

5. The method of claim 1, wherein the redundant second device associated with the first device receives the change set from the buffer of the first device to a buffer at the second device and;
the second device synchronizing (i) a memory space of an application executed by the first device and (ii) a copy of the memory space at the second device by updating the copy of the memory space at the second device using the change set.

6. The method of claim 5, further comprising:
receiving at least one checksum for at least one block of the buffer from the first device; and
using the at least one checksum at the second device to validate a copy of the buffer at the second device.

7. The method of claim 5, wherein:
the redundancy tracking software is executed within an operating system user space; and
the driver is executed within an operating system kernel.

8. The method of claim 5, further comprising:
executing a redundant copy of the application at the second device; and
switching the second device into a primary mode of operation in response to the first device going offline, the redundant copy of the application at the second device using the copy of the memory space.

9. An apparatus used by a first device associated with a redundant second device, the apparatus comprising:
at least one memory; and
at least one processor issuing a synchronization request to a file system of the at least one memory of the first device, the file system configured to cache changes associated with a memory space of an application, the synchronization request causing the file system to send the cached changes to a driver of the first device;
the driver committing the cached changes to a copy of the memory space of the application in order to cause the copy of the memory space of the application to match the memory space of the application, identifying one or more changes being made to the copy of the memory space of the application caused by committing the cached changes;
a buffer, receiving a change set identifying the one or more changes being made to the copy of the memory space of the application; and
transmitting the change set from the buffer to the second device in order to synchronize an additional copy of the memory space of the application at the second device.

10. The apparatus of claim 9, wherein the apparatus includes an operating system user space and an operating system kernel:
the application is executed within the operating system user space; and
the driver and the file system are executed within the operating system kernel.

11. The apparatus of claim 9, wherein the apparatus further includes redundancy tracking software:
the redundancy tracking software calculating at least one checksum for at least one block of the buffer; and
sending the at least one checksum to the second device.

12. The apparatus of claim 11, wherein the redundancy tracking software operates to continually maintain synchronization of the additional copy of the memory space of the application at the second device with the memory space of the application at the first device.

13. The apparatus of claim 10, wherein the redundant second device associated with the first device comprises:
at least one memory;
at least one processor, the second device receiving the change set from the buffer of the first device to a buffer at the second device; and
the processor synchronizing (i) a memory space of an application executed by the first device and (ii) a copy of the memory space stored in the at least one memory of the second device by updating the copy of the memory space at the second device using the change set.

14. The apparatus of claim 13, wherein;
the second device receiving at least one checksum for at least one block of the buffer from the first device; and
the second device uses the at least one checksum to validate a copy of the buffer at the second device.

15. The apparatus of claim 13, wherein the second device includes redundancy tracking software that reads the change set and the at least one checksum in the buffer of the second device and updates the copy of the memory space at the second device.

16. The apparatus of claim 15, wherein:
the redundancy tracking software is executed within an operating system user space; and
the driver is executed within an operating system kernel.

17. The apparatus of claim 16, wherein the apparatus executes a redundant copy of the application at the second device, switching the second device into a primary mode of operation in response to the first device going offline, the redundant copy of the application at the second device using the copy of the memory space.

18. A non-transitory computer readable medium containing instruction that when executed cause at least one processing device of a first device associated with a redundant second device to:
issue a synchronization request to a file system of the first device, the file system configured to cache changes associated with a memory space of an application, the synchronization request causing the file system to send the cached changes to a driver of the first device;
using the driver, commit the cached changes to a copy of the memory space of the application in order to cause the copy of the memory space of the application to match the memory space of the application;
identify one or more changes being made to the copy of the memory space of the application caused by committing the cached changes;
create, in a buffer, a change set identifying the one or more changes being made to the copy of the memory space of the application;
calculate at least one checksum for at least one block of the buffer; and
transmit the change set and the at least one checksum from the buffer to the second device in order to synchronize an additional copy of the memory space of the application at the second device.

19. The non-transitory computer readable medium of claim 18, further containing instruction that, when executed cause the at least one processing device to:
   receive the change set and the at least one checksum from the buffer of the first device to a buffer at the second device;
   synchronize (i) a memory space of an application executed by the first device and (ii) a copy of the memory space at the second device by updating the copy of the memory space at the second device using the change set; and
   use the at least one checksum at the second device to validate the copy of the buffer at the second device.

20. The non-transitory computer readable medium of claim 19, further containing instruction that, when executed cause the at least one processing device to:
   execute a redundant copy of the application at the second device; and
   switch the second device into a primary mode of operation in response to the first device going offline, the redundant copy of the application at the second device using the copy of the memory space.

* * * * *